Aug. 17, 1943.  W. E. KLAUER  2,327,193
SNOW REMOVING MECHANISM
Filed Feb. 15, 1940  8 Sheets-Sheet 5

Patented Aug. 17, 1943

2,327,193

UNITED STATES PATENT OFFICE 2,327,193

SNOW-REMOVING MECHANISM

Walter E. Klauer, Dubuque, Iowa

Application February 15, 1940, Serial No. 319,131

10 Claims. (Cl. 37—43)

The invention relates to snow removing mechanism and particularly to the mounting of such mechanism on a tractor, especially a tractor of the endless track type.

So far as I am aware no one has heretofore provided a successful mounting and drive for a power operated snow remover on a tractor. Efforts have been made to drive snow removers of this type by a power take-off from the tractor driving engine. However, such an arrangement is inadequate as the tractor engine does not provide sufficient power for both moving the tractor and operating the snow remover, particularly in deep snow.

The primary object of the invention therefore is to provide a tractor having an auxiliary source of power for operating the snow remover independent of the ordinary motor for driving the tractor.

A further object of the invention is to provide a manner of mounting a motor constituting such an auxiliary source of power in such a way that it does not interfere with the normal operation of the tractor.

Still another object of the invention is to provide a tractor with a snow remover and a driving motor for the snow remover mounted thereon in such a manner as to preserve adequately the balance of the tractor and to maintain proper frictional engagement of the tracks with the ground over which the tractor is moving.

A further object of the invention is to mount a snow remover on a tractor in such a manner as to transmit to the tractor in a simple and effective fashion all the force to which the snow remover is subjected.

Tractors are now produced in which the individual tracks are mounted to swing about the rear axle independently of the body and of each other, in such a way that the movement of the tracks over irregularities does not tilt the body itself.

Still another object of the invention is to mount a snow remover on a tractor of this type in such a way that the snow remover may remain level with respect to the tractor regardless of the movement of the tracks.

A further object of the invention is to provide a mounting for a snow remover on a tractor of the type just described which is such that the lifting mechanism for the snow remover moves with the movable tracks, while the snow remover itself may remain level in spite of the displacement of the tracks.

Still another object of the invention is to arrange and connect the lifting means in such a manner that the weight of the snow remover acts to hold its driving motor more securely on the tractor.

A further object of the invention is to provide a novel driving shaft connecting a motor on the rear of the tractor of the type just described with a snow remover on the front thereof, the mounting for this shaft including a bearing which moves with the tracks.

Still another object of the invention is to provide push means for the bottom part of the snow remover which extend beneath the tractor and between the wheels and tracks, and which are connected at the rear of the tractor. A further object is to provide on such push means an arrangement for transmitting side thrust into the frame of the tractor at an intermediate point of the push means.

In general, the invention contemplates the mounting of the snow remover on the front of a tractor, and of the driving motor for the snow remover on the rear of the tractor, both the snow remover and the driving motor being mounted respectively in front of and behind the rear axles of the tractor. In this way it is possible to obtain adequate balance on the tractor so that the tracks grip the ground adequately along their full length. Especially, the invention contemplates the mounting of the motor in such a way that its crankshaft is transverse with respect to the tractor, which is particularly advantageous in obtaining the proper balance and proper drive, without unnecessarily lengthening the unit.

Further objects and advantages of the invention will appear more fully from the following description, particularly when taken in conjunction with the accompanying drawings which form a part thereof.

In the drawings:

Fig. 4a is a continuation at the left-hand end of Fig. 4;

Fig. 5 is a cross-section on the line 5—5 of Fig. 4a;

Fig. 14 is a top plan view of the connecting frame between the lifting mechanism and the snow remover;

Fig. 15 is a front elevation thereof; and

Fig. 16 is a cross-section on the line 16—16 of Fig. 15.

The invention is applied to a tractor having a rear axle 2 and a front axle 4 on which are mounted wheels 6 and 8 respectively, these wheels forming the supports for a conventional endless track 10. The tractor further includes a motor 12 connected to rear wheels 6 and a driver's seat 14.

The tractor is preferably of the type in which the whole frame 16 in which is mounted the front wheel 8 and axle 4 can turn about the rear axle 2. This is accomplished for example by mounting the rear end of frame 16 on the rear axle 2.

Figures 11, 12, 13:
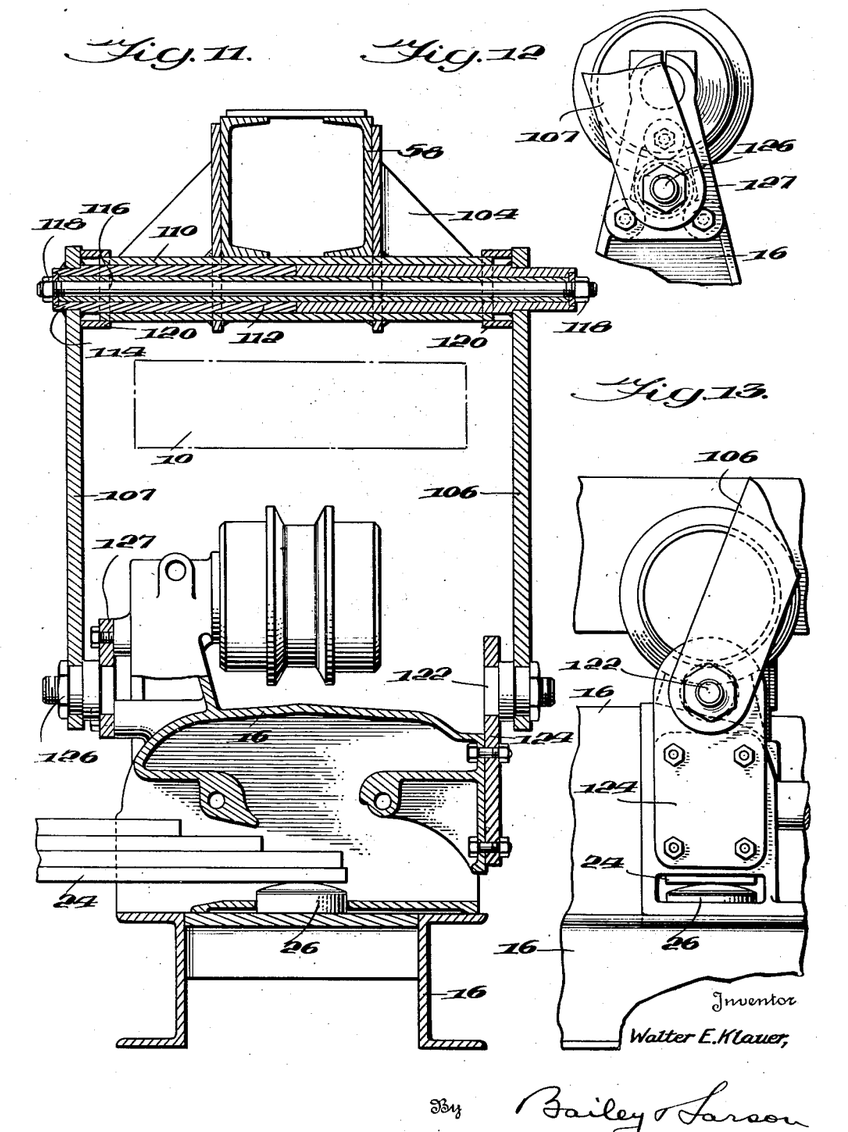
Fig. 11 is a cross-section on the line 11—11 of Fig. 6.
Figs. 12 and 13 are detail views from the left and right respectively of portions of Fig. 11.

The body frame 20 of the tractor is suitably connected to a transverse leaf spring 24 which extends transversely, and the ends of which rest on seats 26 carried by means 16 (see Figs. 11 and 13).

It is obvious that this construction permits either of the front wheels to move upwardly against the spring 24 without tilting the tractor frame, and independently of the other front wheel. The specific construction of the tractor itself forms no part of my invention.

The snow remover is indicated generally at 28 and may be for example of the type shown in my earlier Patent No. 2,144,311. It constitutes as shown in that patent an open-front casing containing augers 30 and behind which is arranged a fan casing 32 having a discharge spout.

The motor 12 for driving the tractor is of course connected in a conventional manner to the rear wheels 6. The motor for driving the snow remover is indicated at 34. It is mounted by triangular brackets 36 and a frame 37 on the rear of the tractor frame, and this frame 37 is connected to the tractor in a secure manner.

The motor is of any conventional type, usually constituted by a Diesel engine. It is arranged in such a manner that its crankshaft 40 extends transversely of the tractor. It may be controlled in any suitable manner by a driver seated in the seat 14, who at the same time can operate and control the tractor itself.

The snow remover 28 has a bottom frame member 95 extending transversely thereof. Connected to this frame member are upwardly and rearwardly inclined bars 44. The upper ends of these bars are provided with blocks 46 slidably guided on push guides 48 of T shape which are mounted on the front of the tractor by brackets 47 secured to a longitudinal frame member 49 of the tractor chassis.

To these blocks are also connected bent frame member 50 which is connected at its ends to the top frame member 94 of the snow remover frame. The snow remover is thus guided for up and down movement on the tractor.

Lifting mechanism is provided for raising and lowering the snow remover. A particular feature of the invention resides in the fact that this mechanism is so arranged as to partake in part at least of the movement of the front wheels of the tractor, while the snow remover itself is kept level with respect to the tractor even though the front wheels of the tractor may be tilted with respect to each other.

The motor frame 37 carries brackets 54, to each of which is pivoted as at 56 a longitudinally extending beam composed of opposed channel members 58 having between their edges a slot 60 (see Figs. 7 to 10). At their forward ends beams 58 are bent in and brought together, as at 62, until their flanges meet. Between the forward ends of these beams 58 is mounted on a shaft 64 a pulley 66. This pulley serves as a guide for a chain 68 which is connected to the snow remover in a manner to be described below at one end, and at its other end is connected to a coil spring 70 arranged within the beam formed by members 58.

Spring 70 at its other end is connected to a U-shaped rod 72, at the closed end thereof. The legs of rod 72 pass through a block 74 and are provided beyond the block with nuts 76 so as to connect them to the block. Pivoted to block 74 by a pin 78 is a piston 80 which is slidable in a conventional hydraulic cylinder 82 supplied with fluid at its forward end by a pipe 84. Cylinder 82 has an extension 86 which is pivoted on a pin 88 passing through and secured in the channel members 58.

It is obvious that the admission of fluid under pressure to pipe 84 and cylinder 82 will move piston 80 rearwardly with respect to the tractor and will thus exert a pull through spring 70 on chain 68. Pipe 84 is connected through a control valve of conventional nature to a pump operated preferably by motor 34. This arrangement is conventional and does not form any part of the invention. Provided in the line 84 adjacent to cylinder 82 is a manual control valve 90, by which the pipe 84 may be closed off. The purpose of this is to permit the operator to lock the cylinder with the snow remover in raised position, so that leakage through the control valve which might otherwise permit the snow remover to slip down cannot occur.

Chains 68 extend downwardly from pulleys 66 to a connecting arrangement shown particularly in Figs. 3 and 14 to 16. Chains 68 are connected to two opposite ends of a transverse bar 92 of T section, which has at its center downwardly extending members 96 secured to truss member 97, so that the whole unit forms a rigid beam. A link 98 is pivoted to this beam by a pin 100 adjacent the top of member 96. This link is in the nature of a strap in the lower end of which is mounted a transverse member 102 which is connected to the snow remover in a manner to be described below.

It is obvious that with this arrangement the admission of fluid to the cylinders will exert a tension on the chains which will be transmitted evenly through the link 98 to lift the snow remover with respect to the tractor.

In order to transmit motion of the front wheels to the beams 58 and thus to the lifting mechanism, there is arranged (see Figs. 1 and 11 to 13) intermediate each beam 58 a bracket 104 to which are pivoted rearwardly and downwardly inclined links 106, 107, outside and inside the tracks respectively, the rear ends of these links being pivoted on the movable frame 16. Details of this mounting are shown in Figs. 11 to 13.

As shown in those figures, bracket 104 is welded to beams 58 and likewise to a tube 110. This tube is turnable on two half sleeves 112 which have extensions 114 through openings in links 106, 107 respectively, and which are traversed by a rod 116 on the ends of which are provided nuts 118. Likewise secured on links 106, 107 are tubular caps 120 which fit over the ends of tube 110.

The outer links 106, which are located on the outside of the tracks, are connected by pivots 122 to members 124 secured to frame 16. Inner links 107, on the other hand, are mounted directly on pins 126 carried by plates 127 mounted on frame 16.

With this mounting it is obvious that as either front wheel of the tractor rises it will exert an upward force on the corresponding beam 58 and will thereby lift the forward end of this beam and the pulley 66. However, because of the connection between chains 68 and the snow remover, the snow remover will be lifted but no twisting force will be exerted thereon which would tend to tilt it with respect to the tractor. The rearward and downward slope of links 106 also has the effect of tending to hold the motor frame more securely on the tractor since the weight of the snow remover exerted on the forward ends of beam 58 and the inclination of links 106 in combination exert a forward pull on beams 58 which through pins 56 and brackets 54 of course exert a similar pull on the motor frame and thus tend to hold it on the tractor.

The snow remover is driven in the conventional manner as shown for example in my prior Patent No. 2,144,311. The driving shaft 128 extends into a casing 130 which contains any suitable driving connection to a shaft 132 which operates the snow remover. Shaft 128 connects through sliding connection 133 and universal joint 134 to a shaft section 136 which is likewise connected by a universal joint 138 to a shaft section 140. The forward end of shaft section 140 is mounted in a self-aligning bearing 142 carried by a bracket 144 mounted on one of the beams 58. The rear end of shaft 140 is connected by a universal joint 146 to stub shaft 148 which through bevel gearing 149 connects to motor shaft 40.

This arrangement permits the intermediate portion of the shaft to move with respect to the tractor when the wheel on that side of the tractor rises or drops, and still provides an intermediate support for the shaft.

Figure 1:
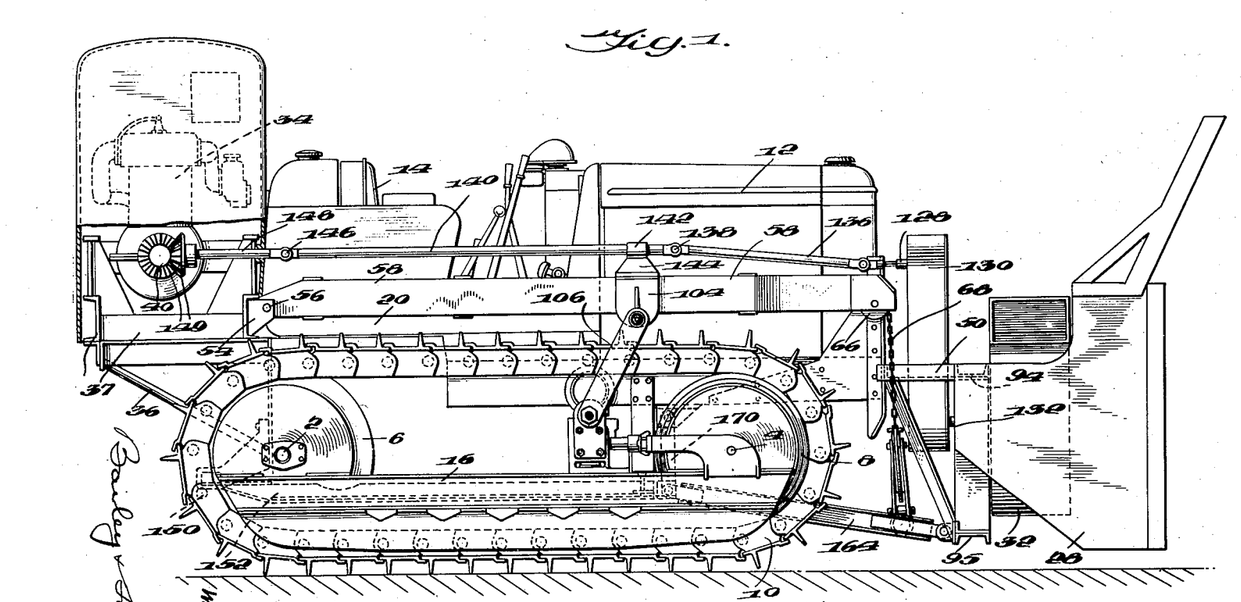
Fig. 1 is a side elevation of a unit embodying the invention.
Figure 2:
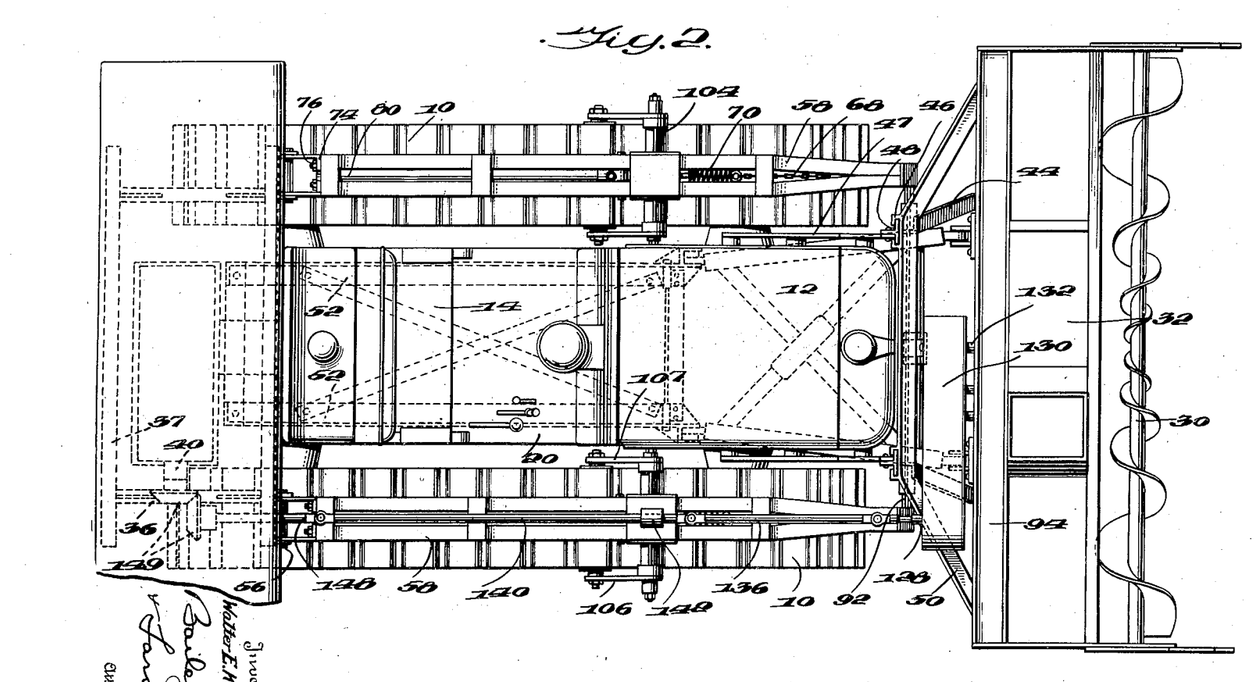
Fig. 2 is a top plan view thereof.
Figure 3:
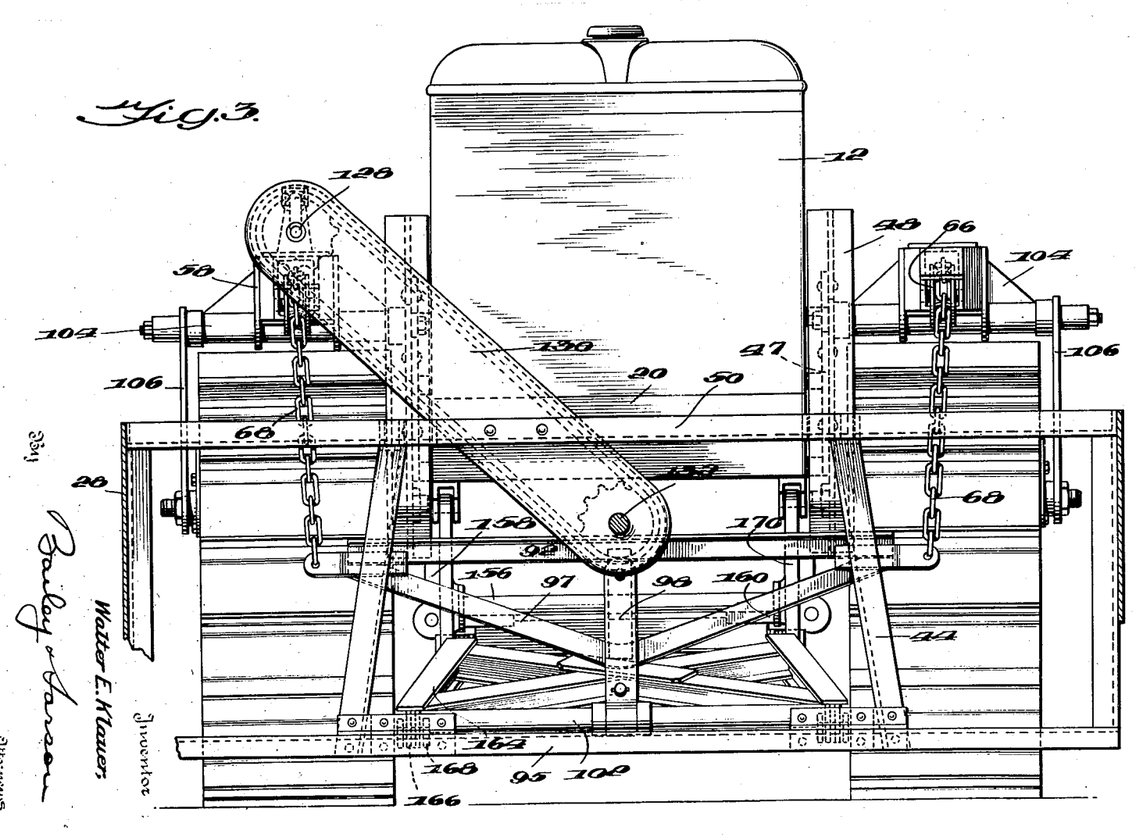
Fig. 3 is a front elevation of the unit with the snow remover omitted.
Figure 4:
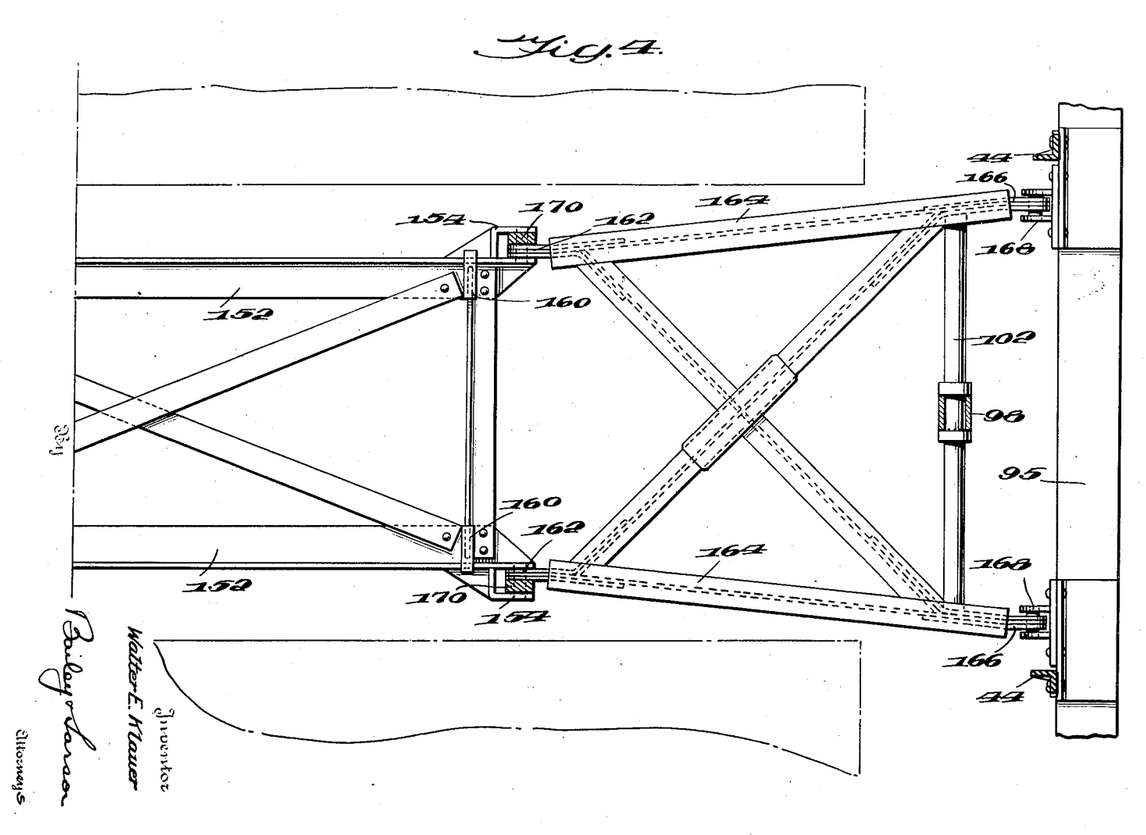
Fig. 4 is a top plan view of a portion of the pushing mechanism for the bottom of the snow remover.
Figures 4A, 5, 14, 15, 16:
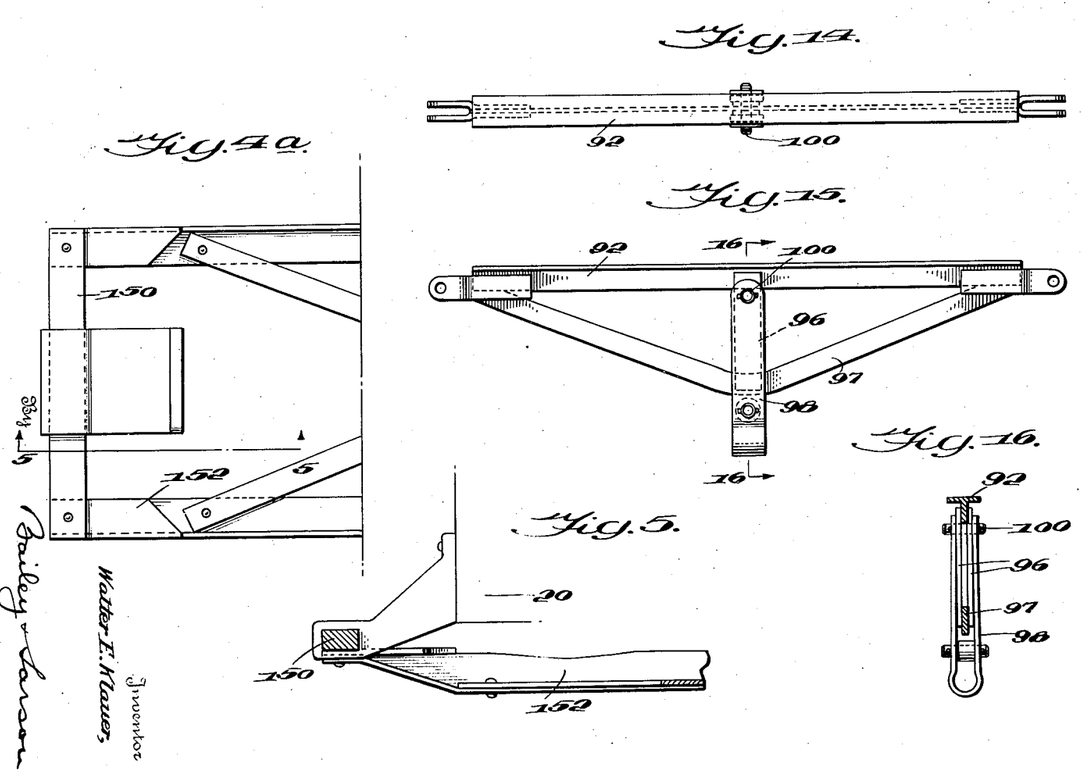
Figure 6:
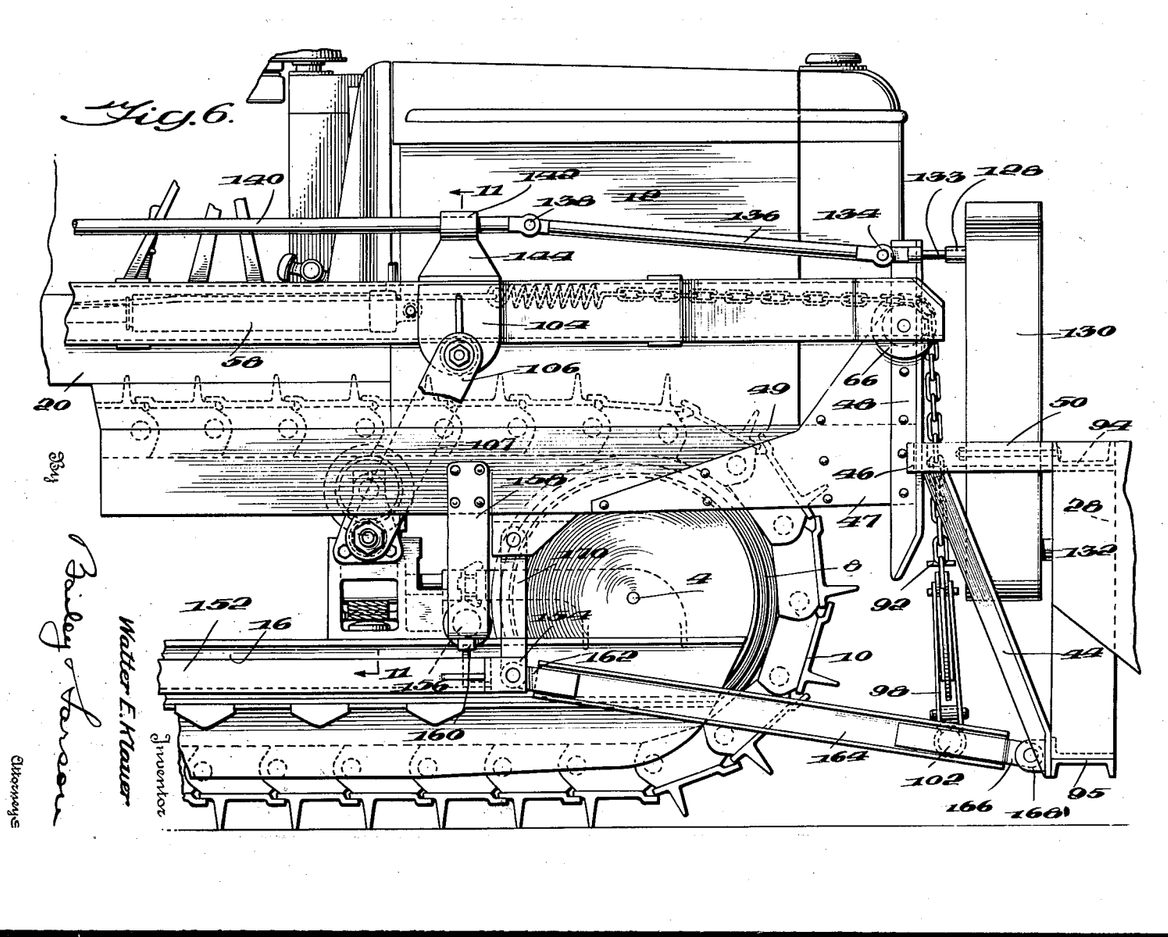
Fig. 6 is a detail side view of the front part of the unit with parts broken away.
Figure 7:
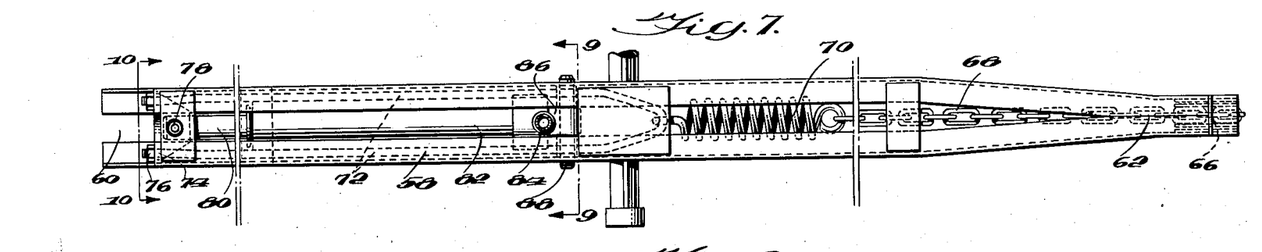
Fig. 7 is a detailed top plan view of one of the lifting mechanisms.
Figures 8, 9, 10:
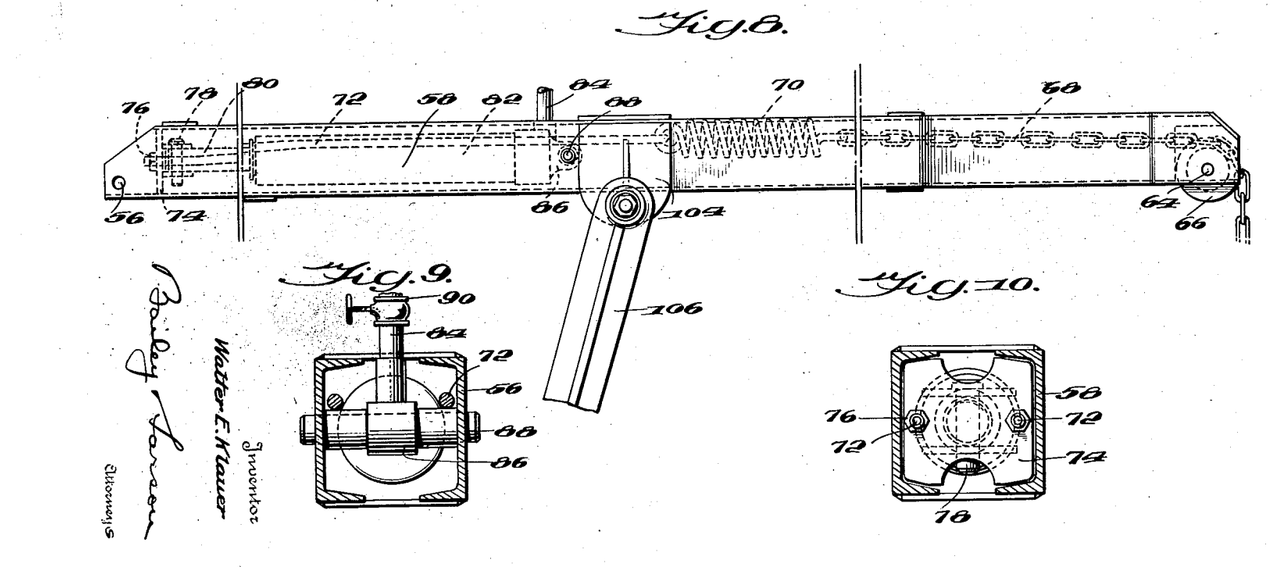
Fig. 8 is a detailed side view thereof.
Figs. 9 and 10 are detailed cross-sections on the lines 9—9 and 10—10 respectively of Fig. 7.

The tractor must of course exert a push on the lower portion of the snow remover. The mechanism for exerting this is shown in Figs. 3 and 4.

The tractor at its rear end is provided with a transverse frame member 150. Connected to this member is a push frame 152 having cross bracing. This frame carries on its forward end forks 154. The tractor frame also includes a transverse member 156 towards the front thereof, at the ends of which are downwardly extending portions 158 forming a part of the connection of member 156 to the remainder of the frame. The front end of push frame 152 carries at each side on top stops or lugs 160. These lugs are arranged to fit between the two members 158 and to engage the bottom of member 156. Thus any lateral thrusts exerted on frame 152 are transmitted to the tractor frame through lugs 160 and portions 158. The frame member 152 is held from dragging on the ground by links 170 pivoted at one end to the frame 152 and at the other end to the tractor frame.

Pivoted in forks 154 are tongues 162 of a front cross-braced frame 164. At the front end of this frame member are tongues 166 which are connected to forks 168 secured on the rear bottom frame member 95 of the snow remover. Frame 164 thus prevents the snow remover from tilting laterally with respect to the tractor.

Adjacent its front end frame 164 carries the transverse member 102 described above, which is connected to the lifting mechanism. In other words, the lifting force is transmitted to frame 164 and by it to the snow remover.

It is believed that the general operation of the construction so described will be apparent. The motor 34 is utilized to drive the augers and fan of the snow remover, or whatever other mechanism may be utilized therein. The snow remover may be raised and lowered by the lifting mechanism contained in beams 58. If the tractor is moving on an unequal surface, movement of front wheels 4 is permitted to prevent too great tilting of the tractor, and this movement, while partially lifting the snow remover, does not tilt it about the tractor since the snow remover is held against tilting by the bottom frame 164 and the guide mechanism 46. Thus the snow remover remains level on the tractor even though the front wheels of the tractor may be tilting.

While I have described herein one embodiment of my invention I wish it to be understood that I do not intend to limit myself thereby except within the scope of the appended claims.

I claim:

1. In combination with a tractor, a motor for driving said tractor, a power operated snow remover, means mounting said snow remover on the front of the tractor for vertical movement with respect thereto, a motor mounted at the rear of said tractor, means connecting the second motor to the snow remover whereby said second motor operates said snow remover, and means to raise and lower the snow remover, said last means being adapted and arranged to convert the weight of the snow remover into a forward force on said motor so as to hold said motor securely on the tractor.

2. In combination with a tractor having a frame and front and rear wheels, means mounting said front wheels for independent vertical movement with respect to said frame, comprising members mounted to turn about the rear axle and carrying said front wheels, and endless tracks carried by said wheels; a snow remover, means mounting said snow remover on the front of the tractor for vertical movement with respect thereto, and means on opposite sides of the tractor to raise and lower the snow remover with respect to the tractor, said means comprising beams pivoted adjacent the rear of said tractor, means connecting intermediate points of said beams to said front wheel mounting means for movement therewith, hydraulic mechanism carried by said beams, a coil spring connected to said mechanism, pulleys mounted at the front ends of said beams, flexible members connected to said spring, a transverse member connected to both said flexible members, and means connecting the central portion of said transverse member to the snow remover.

3. In combination with a tractor, a snow remover, means mounting said snow remover on the front of the tractor for vertical movement with respect thereto, and means on opposite sides of the tractor to raise and lower the snow remover with respect to the tractor, said means comprising beams carried by said tractor, hydraulic mechanism carried by said beams, pulleys mounted at the front ends of said beams, flexible members connected to said hydraulic mechanism and extending over said pulleys, a transverse member connected to both said flexible members, and means connecting the central portion of said transverse member to the snow remover.

4. In combination with a tractor having a frame and front and rear wheels, and endless tracks carried by said wheels; a power operated snow remover, means mounting said snow remover on the front of the tractor, a motor mounted on the rear of said tractor, means connecting said motor to said snow remover to drive the same, said means comprising a shaft extending above one of said tracks, and therefore within the lateral confines of the tractor.

5. In combination with a tractor having a frame and front and rear wheels, and endless tracks carried by said wheels; a power operated snow remover, means mounting said snow remover on the front of the tractor, a motor mounted on the rear of said tractor, means connecting said motor to said snow remover to drive the same, said means comprising a shaft extending above said tracks and having universal joints therein, and a bearing for an intermediate portion of said shaft mounted on said tractor.

6. In combination with a tractor having a frame and front and rear wheels, a rear axle supported by said rear wheels, means mounting said front wheels for independent vertical movement with respect to said frame, said means comprising members mounted to turn about the rear axle and carrying said front wheels, and endless tracks carried by said respective sets of front and rear wheels; a power operated snow remover, means mounting said snow remover on the front of the tractor for vertical movement with respect thereto, a motor mounted on the rear of said tractor, means connecting said motor to said snow remover to drive the same, said means comprising a shaft extending above one of said tracks and having universal joints therein, and a bearing for an intermediate portion of said shaft mounted for movement with said front wheel mounting means.

7. In combination with a tractor of the endless track type having a frame member at the rear thereof, a snow remover mounted on the front of the tractor, and means to transfer forces from the snow remover to the tractor, said means extending beneath the tractor and between the tracks thereof, and comprising a frame connected at its front end to the bottom portion of the snow remover, a frame connected at its rear end to the frame member of the tractor, means connected to the tractor and to the front part of the first said frame to support said front end, both said frames extending between the tracks, and means connecting the adjacent ends of said frames, said first frame having means at its front end engaging the tractor to prevent lateral movement of said front end with respect to the tractor.

8. In combination with a tractor having a frame and front and rear wheels, and endless tracks carried by said wheels; a power operated road machine, means mounting said road machine on the front of the tractor, a motor mounted on the rear of said tractor, means connecting said motor to said road machine to drive the same, said last means comprising a shaft extending above one of said tracks and having universal joints therein, and a bearing for an intermediate portion of said shaft mounted on said tractor.

9. In combination with a tractor having a frame and front and rear wheels, means mounting said front wheels for independent vertical movement with respect to said frame, comprising members mounted to turn about the rear axle and carrying said front wheels, and endless tracks carried by said wheels, a snow remover, a motor mounted at the rear of said tractor, means connecting said motor to the snow remover to operate the same, means mounting said snow remover on the front of the tractor for vertical movement with respect thereto, and means on opposite sides of the tractor to raise and lower the snow remover with respect to the tractor, said means comprising beams pivoted adjacent the rear of said tractor to said motor and extending to a point adjacent the front of the tractor, means connecting intermediate points of said beams to said front wheel mounting means for movement therewith, said last means comprising links on the inside and outside of said tracks connected to said beams and to said frames, said links being downwardly and rearwardly inclined.

10. In combination with a tractor having a frame and front and rear wheels, a rear axle supported by said rear wheels, means mounting said front wheels for independent vertical movement with respect to said frame, said means comprising members mounted to turn about the rear axle and carrying said front wheels, and endless tracks carried by said respective sets of front and rear wheels; a power operated snow remover, means mounting said snow remover on the front of the tractor for vertical movement with respect thereto, means for raising and lowering said snow remover with respect to the tractor, said raising and lowering means comprising beams each disposed above and connected with one of said front wheel carrying means to partake of its independent vertical movement, operable connections between said beams and said snow remover for raising the latter with respect to said beams, all whereby the snow remover may be raised and lowered both in accordance with the vertical movement of said wheel carrying means and also independently thereof, a motor mounted on the rear of said tractor, means connecting said motor to said snow remover to drive the same, said means comprising a shaft extending above one of said tracks and having universal joints therein, and a bearing for an intermediate portion of said shaft mounted on one of said beams for movement with said front wheel mounting means.

WALTER E. KLAUER.